United States Patent
Navarrete Michelini et al.

(10) Patent No.: US 10,880,566 B2
(45) Date of Patent: Dec. 29, 2020

(54) METHOD AND DEVICE FOR IMAGE ENCODING AND IMAGE DECODING

(71) Applicant: BOE Technology Group Co., Ltd., Beijing (CN)

(72) Inventors: Pablo Navarrete Michelini, Beijing (CN); Lijie Zhang, Beijing (CN); Zhenglong Li, Beijing (CN); Jianmin He, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 2 days.

(21) Appl. No.: 16/261,850

(22) Filed: Jan. 30, 2019

(65) Prior Publication Data

US 2019/0166379 A1    May 30, 2019

Related U.S. Application Data

(63) Continuation-in-part of application No. 15/324,503, filed as application No. PCT/CN2016/070034 on Jan. 4, 2016, now abandoned.

(30) Foreign Application Priority Data

Aug. 28, 2015   (CN) .......................... 2015 1 0543583

(51) Int. Cl.
    *H04N 19/463*    (2014.01)
    *H04N 19/33*     (2014.01)
    (Continued)

(52) U.S. Cl.
    CPC ......... *H04N 19/463* (2014.11); *G06T 3/4046* (2013.01); *G06T 3/4053* (2013.01);
    (Continued)

(58) Field of Classification Search
    CPC ... G06T 3/4046; G06T 3/4053; H04N 19/117; H04N 19/136; H04N 19/172; H04N 19/33; H04N 19/463; G06N 3/0454
    See application file for complete search history.

(56) References Cited

U.S. PATENT DOCUMENTS

| 5,802,361 | A  | 9/1998 | Wang  |
|-----------|----|--------|-------|
| 7,197,070 | B1 | 3/2007 | Zhang |

(Continued)

FOREIGN PATENT DOCUMENTS

| CN | 101563926 A | 10/2009 |
|----|-------------|---------|
| CN | 102428693 A | 4/2012  |

(Continued)

OTHER PUBLICATIONS

International Search Report and Written Opinion of International Application No. PCT/CN2016/070034, dated May 17, 2016, 10 pages.

(Continued)

*Primary Examiner* — Mekonen T Bekele
(74) *Attorney, Agent, or Firm* — Westman, Champlin & Koehler, P.A.

(57) ABSTRACT

The present disclosure discloses a method and device for image encoding and a method and device for image decoding. The encoding method comprises steps of: downscaling an input high resolution HR image into a low resolution LR image by a downscaler; compressing the LR image using a first compression method; extracting an index value from at least one of the HR image and the LR image; determining a parameter from a parameter database using the index value; compressing the parameter using a second compression method different from the first compression method; and obtaining a data stream by merging the compressed parameter and the compressed LR image.

8 Claims, 4 Drawing Sheets

(51) Int. Cl.
*G06T 3/40* (2006.01)
*H04N 19/117* (2014.01)
*H04N 19/172* (2014.01)
*H04N 19/136* (2014.01)
*G06N 3/04* (2006.01)

(52) U.S. Cl.
CPC ......... *H04N 19/117* (2014.11); *H04N 19/136* (2014.11); *H04N 19/172* (2014.11); *H04N 19/33* (2014.11); *G06N 3/0454* (2013.01)

(56) References Cited

U.S. PATENT DOCUMENTS

| | | | |
|---|---|---|---|
| 7,266,148 B2 | 9/2007 | Kim | |
| 8,351,731 B2 | 1/2013 | Guan | |
| 8,422,806 B2 | 4/2013 | Fukuhara | |
| 8,532,437 B2 | 9/2013 | Christiansen | |
| 8,538,201 B2* | 9/2013 | Damkat | G06T 3/4053 382/299 |
| 8,582,666 B2* | 11/2013 | Zuo | H04N 19/179 375/240.29 |
| 8,855,418 B2 | 10/2014 | Christiansen | |
| 8,949,892 B2 | 2/2015 | Kiok et al. | |
| 9,554,083 B2 | 1/2017 | Jeon et al. | |
| 10,325,346 B2* | 6/2019 | Oztireli | G06T 7/73 |
| 2006/0153299 A1 | 7/2006 | Iwata | |
| 2007/0253479 A1 | 11/2007 | Mukherjee | |
| 2009/0161947 A1 | 6/2009 | Choki | |
| 2010/0129000 A1 | 5/2010 | Strom | |
| 2010/0142836 A1* | 6/2010 | Joshi | H04N 19/46 382/233 |
| 2011/0216975 A1* | 9/2011 | Rother | G06T 17/00 382/173 |
| 2011/0243438 A1* | 10/2011 | Hoppe | G06T 3/4007 382/167 |
| 2011/0243470 A1 | 10/2011 | Noguchi | |
| 2011/0268193 A1 | 11/2011 | Cho | |
| 2013/0088600 A1 | 4/2013 | Wu et al. | |
| 2014/0036033 A1 | 2/2014 | Takahashi | |
| 2014/0079330 A1 | 3/2014 | Zuo et al. | |
| 2014/0192868 A1 | 7/2014 | Chen | |
| 2014/0267283 A1* | 9/2014 | Nystad | G06T 9/00 345/428 |
| 2014/0321540 A1 | 10/2014 | Leontaris | |
| 2015/0030072 A1 | 1/2015 | Chiu | |
| 2015/0042878 A1 | 2/2015 | Jeon et al. | |
| 2015/0181261 A1 | 6/2015 | Kiok et al. | |
| 2015/0195523 A1 | 7/2015 | Sato | |
| 2015/0195525 A1 | 7/2015 | Sullivan | |
| 2015/0205792 A1* | 7/2015 | Pau | G06K 9/4671 382/162 |
| 2015/0256837 A1 | 9/2015 | Bar-On | |
| 2015/0341648 A1 | 11/2015 | Auyeung | |
| 2016/0014411 A1* | 1/2016 | Sychev | H04N 19/56 375/240.12 |
| 2016/0048536 A1* | 2/2016 | Di | G06F 16/5838 382/165 |
| 2016/0165260 A1 | 6/2016 | Lee | |
| 2016/0173892 A1 | 6/2016 | Park | |
| 2016/0212438 A1 | 7/2016 | Andersson | |
| 2017/0024852 A1* | 1/2017 | Oztireli | G06T 5/50 |
| 2019/0082186 A1* | 3/2019 | Van Der Vleuten | H04N 19/59 |

FOREIGN PATENT DOCUMENTS

| | | |
|---|---|---|
| CN | 104378631 A | 2/2015 |
| CN | 105163124 A | 12/2015 |
| EP | 2 487 918 A1 | 8/2012 |
| JP | 20120200010 A | 10/2012 |

OTHER PUBLICATIONS

English translation of Box No. V of the Written Opinion for the International Searching Authority for International Application No. PCT/CN2016/070034, 2 pages.

First Office Action from Chinese Patent Application No. 201510543583.7, dated Nov. 3, 2017, 11 pages.

U.S. Patent and Trademark Office-issued prosecution for U.S. Appl. No. 15/324,503, filed Jan. 6, 2017, including: Notice of Allowance and Fees Due (PTOL-85), including PTO-892, dated Oct. 29, 2018, 9 pages; Non-Final Rejection, including PTO-892, dated Jul. 5, 2018, 13 pages; and Requirement for Restriction/Election, dated Apr. 25, 2018, 7 pages; 29 pages total.

\* cited by examiner

METHOD AND DEVICE FOR IMAGE ENCODING AND IMAGE DECODING

CROSS-REFERENCE TO RELATED APPLICATIONS

This application is a continuation-in-part of U.S. application Ser. No. 15/324,503, filed on Jan. 6, 2017, which published as U.S. Pub. No. 2017/0201759 A1 on Jul. 13, 2017, which is a 371 National Stage of International Application No. PCT/CN2016/070034, filed on Jan. 4, 2016, which has not yet published, entitled "METHOD AND DEVICE FOR IMAGE ENCODING AND IMAGE DECODING", and claims priority to Chinese Patent Application No. 201510543583.7 filed on Aug. 28, 2015, the disclosures of which are incorporated herein by reference in their entirety.

TECHNICAL FIELD

The present disclosure relates to the field of image processing, and especially to a method and device for image encoding and a method and device for image decoding.

BACKGROUND

Images can be compressed for transmission or storage, so as to reduce a total amount of transmission or storage. Image compression may be categorized into lossless compression and lossy compression. In lossless compression, source information can be accurately recovered after compression and decompression, while in lossy compression, the source information cannot be accurately recovered after compression and decompression, which means, some information will be lost.

When compression is implemented by a conventional encoder, compression mode has already been determined. Therefore, decoder at a counterpart end needs to perform decoding according to a corresponding decoding method. However, if the corresponding decoding mode is not supported by the counterpart end, or other compression mode is required by the user, then requirements of user can't be satisfied. The image encoding is not flexible enough.

SUMMARY

Embodiments of the present disclosure provide a method and device for image encoding, and a method and device for image decoding, which may solve technical issues of inflexible image encoding.

In order to achieve the object as mentioned above, the embodiments of the present disclosure utilize the following technical solutions.

In a first aspect, an embodiment of the present disclosure provides a method for image encoding, comprising steps of: acquiring a first image; compressing the first image to generate a second image, a resolution of the second image is lower than that of the first image; encoding the second image to generate a first bit stream; determining a parameter corresponding to the first image from a parameter database, the parameter corresponds to detail information of the first image; generating a second bit stream according to the parameter; and combining the first bit stream and the second bit stream into a transmission bit stream.

In conjunction with the first aspect and in a first alternative implementation of the first aspect, the step of determining a parameter corresponding to the first image from a parameter database comprises: determining the parameter corresponding to the first image from the parameter database according to a content type of the first image.

In conjunction with the first aspect and in a second alternative implementation of the first aspect, prior to determining the parameter corresponding to the first image from the parameter database according to the content type of the first image, the method further comprises: determining a resolution of the first image and determining the content type of the first image according to the resolution of the first image.

In conjunction with the first aspect and in a third alternative implementation of the first aspect, the step of generating a second bit stream according to the parameter comprises: compressing the parameter to generate the second bit stream.

In conjunction with the first aspect and in a fourth alternative implementation of the first aspect, the parameter database comprises at least one parameter and at least one detail information, and the at least one parameter corresponds to the at least one detail information in a one to one correspondence.

In conjunction with the first aspect and in a fifth alternative implementation of the first aspect, the method further comprises: acquiring N images, where N is an integer greater than 1; establishing a mapping relationship between the $m^{th}$ piece of detail information commonly contained in the N images and the $m^{th}$ parameter; storing the $m^{th}$ piece of detail information, the $m^{th}$ parameter and the mapping relationship therebetween in the parameter database.

In a second aspect, an embodiment of the present disclosure provides a method for image decoding comprising steps of: acquiring a transmission data stream, and dividing the transmission data stream into a first bit stream and a second bit stream; decompressing the first bit stream to generate a second image; and according to user requirement, outputting the second image or a first image obtained by using the second image, wherein the first image is obtained by the following steps of: obtaining a parameter corresponding to the first image according to the second bit stream; determining detail information of the first image from the parameter database according to the obtained parameter; and obtaining the first image based on the second image and the detail information.

In conjunction with the second aspect and in a first alternative implementation of the second aspect, the step of obtaining a parameter corresponding to the first image according to the second bit stream comprises: decompressing the second bit stream to obtain the parameter corresponding to the first image.

In a third aspect, an embodiment of the present disclosure provides a device for image encoding comprising: an acquiring unit configured to acquire a first image; a first processing unit configured to compress the first image to generate a second image, and encode the second image to generate a first bit stream, wherein a resolution of the second image is lower than that of the first image; a second processing unit configured to determine a parameter corresponding to the first image from a parameter database, generate a second bit stream according to the parameter, the parameter corresponds to detail information of the first image; and a combining unit configured to combine the first bit stream and the second bit stream into a transmission bit stream.

In conjunction with the third aspect and in a first alternative implementation of the third aspect, the second processing unit is configured to: determine the parameter corresponding to the first image from the parameter database according to a content type of the first image.

In conjunction with the third aspect and in a second alternative implementation of the third aspect, the second processing unit is configured to: determine a resolution of the first image and determine the content type of the first image according to the resolution of the first image.

In conjunction with the third aspect and in a third alternative implementation of the third aspect, the second processing unit is configured to: compress the parameter to generate the second bit stream.

In conjunction with the third aspect and in a fourth alternative implementation of the third aspect, the parameter database comprises at least one parameter and at least one detail information, and the at least one parameter corresponds to the at least one detail information in a one to one correspondence.

In conjunction with the third aspect and in a fifth alternative implementation of the third aspect, the second processing unit is further configured to: obtain N images, where N is an integer greater than 1; establish a mapping relationship between the $m^{th}$ piece of detail information commonly contained in the N images and the $m^{th}$ parameter; store the $m^{th}$ piece of detail information, the $m^{th}$ parameter and the mapping relationship therebetween in the parameter database.

In a fourth aspect, the embodiment of the present disclosure provides a device for image decoding comprising: an acquiring unit configured to acquire a transmission data stream; a dividing unit configured to divide the transmission data stream into a first bit stream and a second bit stream; a first processing unit configured to decompress the first bit stream to generate a second image; a second processing unit configured to obtain a parameter corresponding to the first image according to the second bit stream, and determine detail information of the first image from the parameter database according to the obtained parameter; a combining unit configured to obtain the first image based on the second image and the detail information; and an output unit configured to output the second image or the first image according to user requirement, In conjunction with the fourth aspect and in a first alternative implementation of the fourth aspect, the second processing unit is configured to: decompress the second bit stream to obtain the parameter corresponding to the first image.

The embodiments of the present disclosure provide a method and device for image encoding and a method and device for image decoding. The method comprises steps of: acquiring a first image, compressing the first image to generate a second image; encoding the second image to generate a first bit stream; determining a parameter corresponding to the first image from a parameter database; generating a second bit stream according to the parameter; and combining the first bit stream and the second bit stream into a transmission bit stream. By encoding the first image to generate the first bit stream and the second bit stream, the present disclosure may enable the decoder at the counterpart end to select images with different resolutions according to particular situations, so as to better satisfy user requirements and solve the technical issue of inflexible image encoding manner.

BRIEF DESCRIPTION OF THE DRAWINGS

In order to more clearly illustrate the technical solutions of the embodiments of the present disclosure, the following drawings will be briefly described in connection with the embodiments, and it will be obvious that the drawings in the following description are only some of the present disclosure and it will be apparent to those skilled in the art that other drawings may be obtained without departing from the scope of the inventive work in accordance with these drawings.

DETAILED DESCRIPTION

The technical solutions of embodiments of the present disclosure would be clearly and completely illustrated in conjunction with accompany drawings. It is obvious that the illustrated embodiments are only a partial of embodiments of the present disclosure and are not all of the embodiments. All of other embodiments obtained by those skilled in the art on the basis of the embodiments of the present disclosure without paying creative efforts fall in the scope of the present disclosure.

Figure 1:
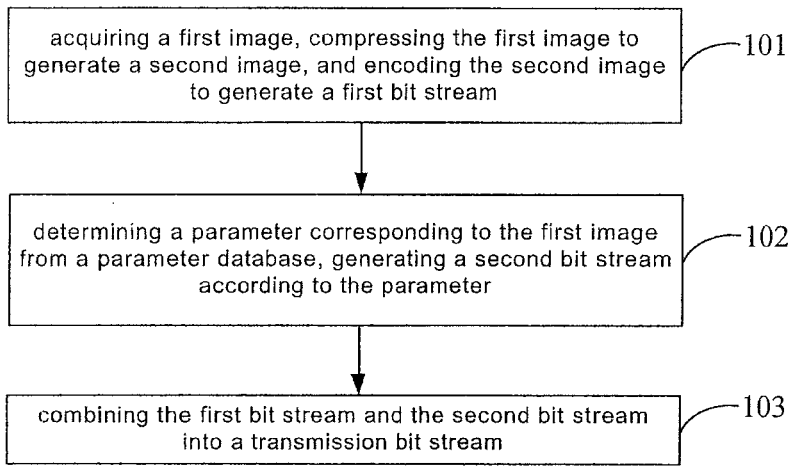
FIG. 1 is a schematic flowchart of a method for image encoding provided by an embodiment of the present disclosure.

An embodiment of the present disclosure provides a method for image encoding which is preferably applied to a device for image encoding. The device for image encoding may be an encoder. It is noted here that the embodiment is only illustrated by way of example and does not limit the present disclosure. As shown in FIG. 1, the method for image encoding comprises the following steps:

At step 101, a first image is acquired and then compressed to generate a second image, and the second image is encoded to generate a first bit stream.

A resolution of the second image is lower than that of the first image. In one embodiment, there are many ways for image compression, and the present application is not limited thereto. In one embodiment, firstly, the original image is smoothed or filtered; secondly, some of pixels in the processed image fall in correct space. (For example, in four adjacent pixels, only one pixel is selected and the remaining three pixels are discarded).

At step 102, a parameter corresponding to the first image is determined from a stored parameter database, and a second bit stream is generated according to the parameter corresponding to the first image.

The parameter corresponding to the first image and detail information of the first image correspond to each other.

In one embodiment, the parameter corresponding to the first image may be compressed to generate a second bit stream. In this way, one parameter can be utilized to replace data contained in the detail information, which reduces the amount of data for transmission.

It should be noted that, in conjunction with step 101, the first image is HR (High Resolution) image, the second image is LR (Low Resolution) image, and the HR image≈F(LR image, detail information). That is to say, the first image can be substantially obtained by the second image and the detail information of the first image. In one embodiment, in step 101, the second image is generated by filtering and compressing the first image, coefficients of the filter are the detail information of the first image, and the first image can be restored by the coefficients of the filter and the second image. It should be understood that the description herein is only illustrated by way of example and the present disclosure is not limited thereto.

In one embodiment, the parameter corresponding to the first image may be determined in the parameter database according to a content type of the first image. In one embodiment, the parameter database contains at least one parameter and at least one detail information, and one parameter corresponds to one detail information. The detail information may be the coefficients of the filter (typically containing a set of data).

In one embodiment, the detail information may be classified according to the resolution of the image, i.e. the resolution of the first image may be determined and the content type of the first image may be determined based on the resolution of the first image. In one embodiment, the content type of the first image may include: motion, nature, cartoon, and the like. Different resolutions (for example, 1080P, 720P, 576P, etc.) correspond to different content types, which in turn correspond to different parameters.

It should be noted that the parameter database may be pre-set. In one embodiment, the parameter database may be constructed in the following way: N images are acquired, where N is an integer greater than 1; a mapping relationship between the $m^{th}$ piece of detail information commonly contained in the N images and the $m^{th}$ parameter is established; the $m^{th}$ piece of detail information, the $m^{th}$ parameter and the mapping relationship therebetween are stored in the parameter database.

At step 103, the first bit stream and the second bit stream are combined into a transmission bit stream, In this way, when the counterpart decoder receives the transmission bit stream, it can decode according to specific situations. The counterpart decoder can obtain the second image with a low resolution according to the first bit stream and can obtain the first image with a high resolution according to the first bit stream and the second bit stream, so as to better meet the user requirement.

The method provided by the embodiment of the present disclosure comprises steps of: acquiring a first image; compressing the first image to generate a second image, and encoding the second image to generate a first bit stream; determining a parameter corresponding to the first image from a parameter database, generating a second bit stream according to the parameter; and combining the first bit stream and the second bit stream into a transmission bit stream. By encoding the first image to generate the first bit stream and the second bit stream, the counterpart decoder can select images with different resolutions according to specific situations to better meet the user requirement, which may solve technical issues of inflexible image encoding.

Figure 2:
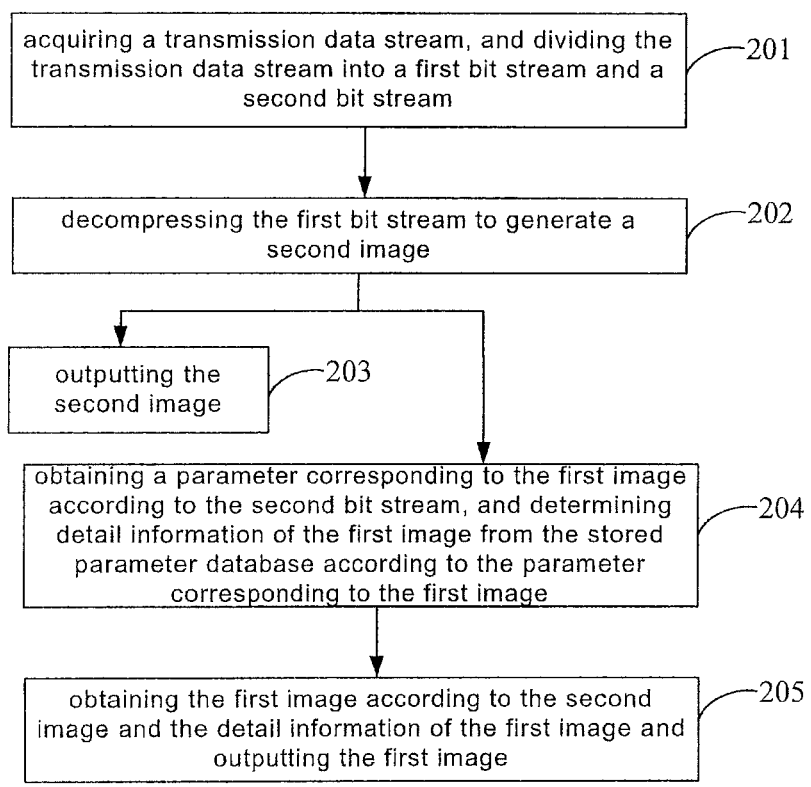
FIG. 2 is a schematic flowchart of a method for image decoding according to an embodiment of the present disclosure.

In conjunction with the embodiment corresponding to FIG. 1, the embodiment of the present disclosure provides a method for image decoding, which is corresponding to the method for image coding as described in the embodiment corresponding to FIG. 1. Preferably, the method is applied to a device for image decoding. The device for image decoding maybe a decoder. It is only illustrated by way of example and is not intended to limit the scope of the disclosure. As shown in FIG. 2, The method for image decoding comprises steps of:

At step 201, a transmission data stream is acquired, and the transmission data stream is divided into a first bit stream and a second bit stream.

At step 202, the first bit stream is decompressed to generate a second image.

In the following, the second image is output at step 203 or the first image is output by utilizing the following steps 204-205.

At step 204, a parameter corresponding to the first image is obtained according to the second bit stream, and detail information of the first image is acquired from the stored parameter database according to the parameter corresponding to the first image.

The parameter corresponding to the first image and the detail information of the first image correspond to each other. In one embodiment, the second bit stream may be decompressed to obtain the parameter corresponding to the first image.

It should be noted that the parameter database may be pre-set. In one embodiment, the parameter database may be constructed in the following way: N images are acquired, where N is an integer greater than 1; a mapping relationship between the $m^{th}$ piece of detail information commonly contained in the N images and the $m^{th}$ parameter is established; the $m^{th}$ piece of detail information, the $m^{th}$ parameter and the mapping relationship therebetween are stored in the parameter database.

At step 205, the first image is acquired according to the second image and the detail information of the first image. Then, the first image is output.

The decoding device may acquire the second image with a lower resolution by the steps of 201, 202 and 203 and may acquire the first image with a high resolution by the steps of 201, 202, 204 and 205 to meet the user requirement and to get a flexible decoding manner.

The method provided by the embodiment of the present disclosure comprises steps of: acquiring a transmission data stream and dividing the transmission data stream into a first bit stream and a second bit stream; decompressing the first bit stream to generate a second image; and outputting the second image; or acquiring a parameter corresponding to the first image according to the second bit stream, acquiring detail information of the first image from the stored parameter database according to the parameter corresponding to the first image, and obtaining the first image according to the second image and the detail information of the first image, and then outputting the first image. The method can select images with different resolutions according to specific situations to better meet the user requirement, which may solve technical issues of inflexible image encoding.

Figure 3:
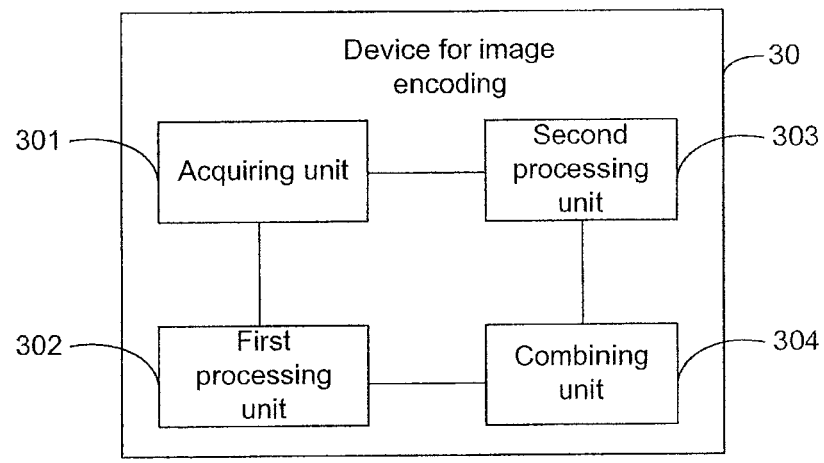
FIG. 3 is a schematic diagram of a configuration of a device for image encoding according to an embodiment of the present disclosure.

On the basis of the embodiment corresponding to FIG. 1, the embodiment of the present disclosure provides a device for image encoding. Referring to FIG. 3, the device for image encoding 30 includes an acquiring unit 301, a first processing unit 302, a second processing unit 303 and a combining unit 304.

The acquiring unit 301 is configured to acquire a first image.

The first processing unit 302 is configured to compress the first image acquired by the acquiring unit 301 to generate a second image, and encode the second image to generate a first bit stream, in which a resolution of the second image is lower than that of the first image.

The second processing unit 303 is configured to determine a parameter corresponding to the first image acquired by the acquiring unit 301 from a stored parameter database, and generate a second bit stream according to the parameter corresponding to the first image. The parameter corresponding to the first image and the detail information of the first image correspond to each other.

The combining unit 304 is configured to combine the first bit stream generated by the first processing unit 302 and the second bit stream generated by the second processing unit 303 into a transmission bit stream.

In one embodiment, the second processing unit 303 is particularly configured to determine a parameter corresponding to the first image from the parameter database according to a content type of the first image.

In one embodiment, the second processing unit 303 is further configured to determine a resolution of the first image and determine the content type of the first image according to the resolution of the first image.

In one embodiment, the second processing unit 303 is further configured to compress the parameter corresponding to the first image to generate the second bit stream.

In one embodiment, the parameter database comprises at least one parameter and at least one detail information, and the at least one parameter corresponds to the at least one detail information.

In one embodiment, the second processing unit 303 is further configured to: acquire N images, where N is an integer greater than 1; establish a mapping relationship between the $m^{th}$ piece of detail information commonly contained in the N images and the $m^{th}$ parameter; store the $m^{th}$ piece of detail information, the $m^{th}$ parameter and the mapping relationship therebetween in the parameter database.

The device for image encoding provided by the embodiment of the present disclosure is configured to: acquire a first image; compressing the first image to generate a second image, and encode the second image to generate a first bit stream; determine a parameter corresponding to the first image from a stored parameter database, generate a second bit stream according to the parameter corresponding to the first image, the parameter corresponds to detail information of the first image; and combine the first bit stream and the second bit stream into a transmission bit stream. By encoding the first image to generate the first bit stream and the second bit stream, the counterpart decoder can select images with different resolutions according to specific situations to better meet the user requirement, which may solve technical issues of inflexible image encoding.

Figure 4:
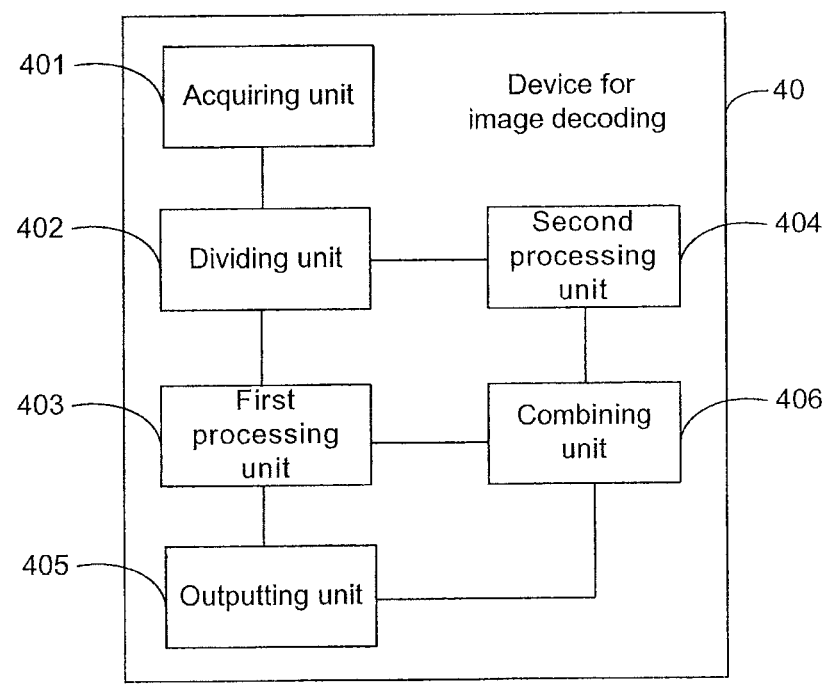
FIG. 4 is a schematic diagram of a configuration a device for image decoding according to an embodiment of the present disclosure.

On the basis of the embodiment corresponding to FIG. 2, the embodiment of the present disclosure provides a device for image decoding. Referring to FIG. 4, the device for image decoding 40 comprises an acquiring unit 401, a dividing unit 402, a first processing unit 403, a second processing unit 404, an output unit 405 and a combining unit 406.

The acquiring unit 401 is configured to acquire a transmission data stream.

The dividing unit 402 is configured to divide the transmission data stream acquired by the acquiring unit 401 into a first bit stream and a second bit stream.

The first processing unit 403 is configured to decompress the first bit stream divided by the dividing unit 402 to generate a second image.

The second processing unit 404 is configured to determine a parameter corresponding to the first image according to the second bit stream divided by the dividing unit 402 and acquire detail information of the first image from the stored parameter database according to the parameter corresponding to the first image. The parameter corresponding to the first image corresponds to the detail information of the first image.

The combining unit 406 is configured to acquire the first image according to the second image generated by the first processing unit 403 and the detail information of the first image determined by the second processing unit 404.

The output unit 405 is configured to output the second image generated by the first processing unit 403 or the first image obtained by the combining unit 406 according to user requirement.

In one embodiment, the second processing unit 404 is configured to decompress the second bit stream to obtain the parameter corresponding to the first image.

The device for image decoding provided by the embodiment of the present disclosure is configured to: acquire a transmission data stream and divide the transmission data stream into a first bit stream and a second bit stream; decompress the first bit stream to generate a second image; and output the second image; or obtain a parameter corresponding to the first image according to the second bit stream; determine detail information of the first image from the stored parameter database according to the parameter corresponding to the first image; obtain the first image according to the second image and the detail information of the first image, and output the first image. The device for image decoding can select images with different resolutions according to specific situations to better meet the user requirement, which may solve technical issues of inflexible image encoding.

In other embodiments, the parameters can refer to specific model parameters for a specific upscaler to be used at the counterpart end. In these embodiments, the detailed information may be omitted from the solution, since the parameters themselves can be sufficient to approximately recover the HR image from the downscaled LR image in the case the upscaler has been predetermined. Instead, index for the parameters in the parameter database may be defined to establish the database. The index may be one-dimensional or two-dimensional. For example, the one-dimensional index may be content type of original HR image or resolution of the downscaled LR image. Also, the two-dimensional index may be a combination of the content type of original HR image and the resolution of the downscaled LR image.

These embodiments can be advantageous, since upscaling at the counterpart end can be independent from the downscaling manner at the encoding end, and the compression of the downscaled LR image can be conventional so that decompressing requirements can be easily satisfied at the counterpart end.

Exemplary processes for these embodiments can be described as below.

Encoding

Figure 5:
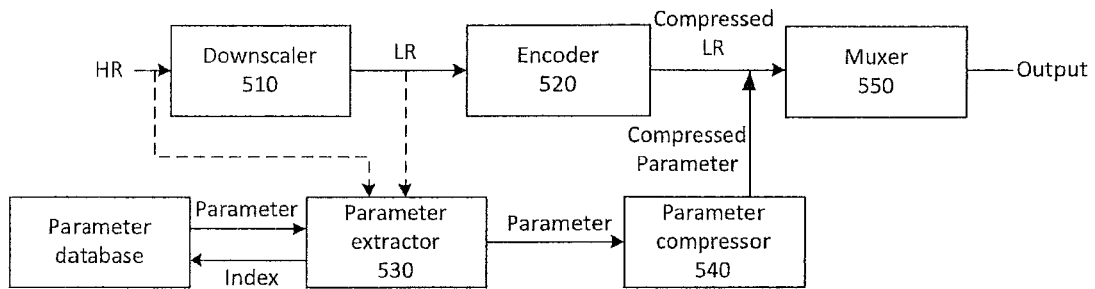
FIG. 5 shows an encoding device according to the embodiments.
Figure 6:
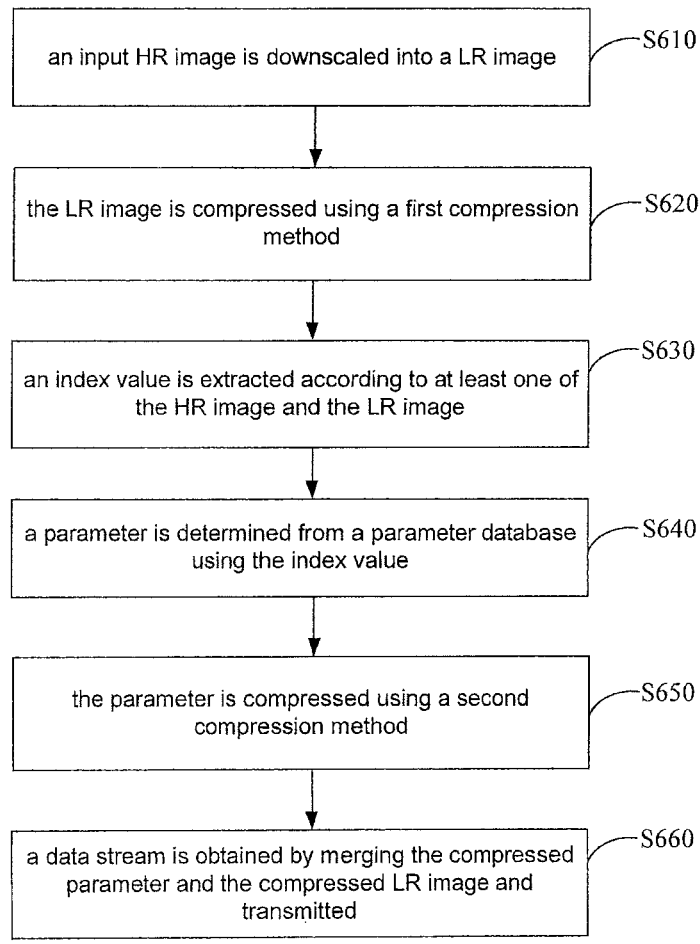
FIG. 6 shows exemplary encoding process using an encoding device according to the embodiments.

FIG. 5 shows an encoding device 500 according to these embodiments. FIG. 6 shows exemplary encoding process using an encoding device (e.g. the encoding device 500) according to the embodiments.

As shown in FIG. 5, the encoding device 500 comprises a downscaler 510, an encoder 520, a parameter extractor 530, a parameter compressor 540 and a muxer 550.

The downscaler 510 receives an input HR image HR1 and downscales it into a LR image LR1. The downscaler 510 may be any conventional downscaler, e.g. a liner downscaler or a Bicubic downscaler. The HR image HR1 may be a high resolution image in for example 4K resolution (4096×2880), and the LR image LR1 may be of a target resolution HD (1024×720).

The encoder 520 receives the LR image LR1 from the downscaler 510, and compresses it with a conventional compressing method. For example, the encoder 520 may be a standard Image/Video Encoder (e.g. PNG, HEVC, AVC, MPEG-2, JPEG 2000, etc.).

The parameter extractor 530 may receive at least one of the HR image HR1 and the LR image LR1, and obtain the index value from the HR1 and/or the LR1. As stated above, the index value may be of one variable, which is the content type of HR1 or the resolution of the LR1. Alternatively, the index value may be of two variables, i.e. the content type of HR1 and the resolution of the LR1. With the index value, the parameter extractor 530 searches the parameter database, which may be in a form of a look-up table. The parameter can be determined from the database with the index value, which will be used by the upscaler at the counterpart end for recovery of the HR image.

As an example, the parameter extractor 530 can perform content classification operation on the HR1 using a conventional content classifier, e.g. VGG-19 classifier which classifies images into 1000 classes. The content can be classified into classes with respect to the object in the image, such as car, human, etc. Alternatively, the content may be classified with respect to the style of the image, e.g. cartoon, old movie, nature, grey, etc.

The parameter has a form determined according to the upscaler to be used at the counterpart end. For example, the upscaler may be a SRCNN standard network, which has been introduced by *Learning a deep convolutional network for image super-resolution* In in Proceedings of European Conference on Computer Vision (ECCV), Dong, C.; Loy, C. C.; He, K.; and Tang, X, 2014b. For SRCNN, the parameter may be a binary file with 6000 32-bit floating point numbers.

The parameter compressor 540 further compresses the extracted parameter using any compression method, which may be any new or conventional compression method. Forward compatibility is maintained with respect to the compression of the parameter. For example, the parameter of the 6000 32-bit floating point numbers can be compressed into one zip file in an exemplary case.

The muxer 550 receives the compressed LR image LR1 and the compressed parameter, for example the PNG file and the zip file. The muxer 550 merges these two files into one binary file, and transmits the merged binary file to the counterpart end in a data stream.

Accordingly, the process 600 comprises steps S610-S660, which can be used by the encoding device 500 as above. Hence, some explanations of the details may be omitted here for simplicity.

In Step S610, an input HR image is downscaled into a LR image.

In Step S620, the LR image is compressed using a first compression method (e.g. a conventional compression PNG).

In Step S630, an index value is extracted from at least one of the HR image and the LR image.

In Step S640, a parameter is determined from a parameter database using the index value.

In Step S650, the parameter is compressed using a second compression method (e.g. a zip method).

In Step S660, a data stream is obtained by merging the compressed parameter and the compressed LR image and transmitted.

Decoding

Figure 7:
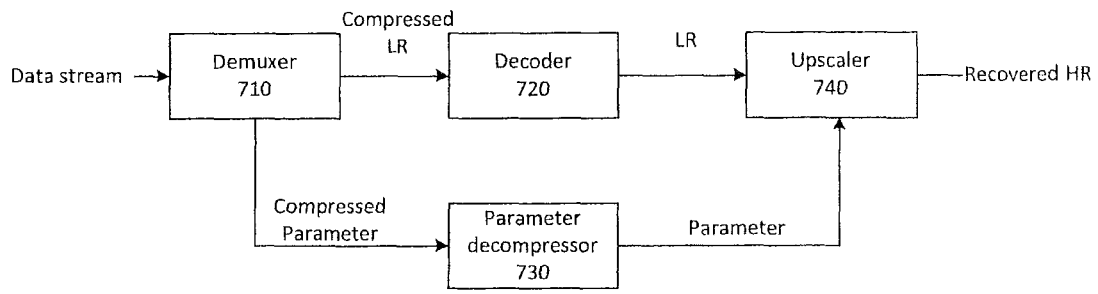
FIG. 7 shows a decoding device according to the embodiments.
Figure 8:
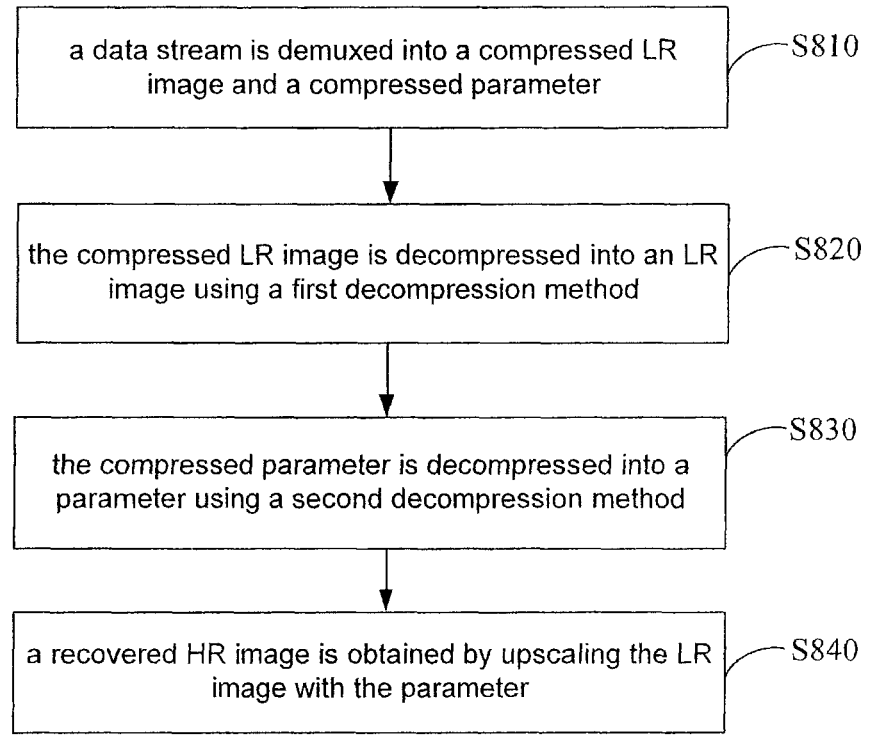
FIG. 8 shows exemplary decoding process using a decoding device according to the embodiments

FIG. 7 shows a decoding device 700 according to the embodiments. FIG. 8 shows exemplary decoding process using a decoding device (e.g. the decoding device 700) according to the embodiments.

As shown in FIG. 7, the decoding device 700 comprises a demuxer 710, a decoder 720, a parameter decompressor 730 and an upscaler 740.

The demuxer 710 receives a data stream from the encoding end (e.g. the encoding device 500 as in FIG. 5) and demux it into a compressed LR image and a compressed parameter. For example, the received data stream may be a merged binary file of a PNG file relating to the LR image and a zip file relating to the parameter. The merged binary file is demuxed into the PNG file and the zip file for decompression.

The decoder 720 receives the compressed LR image and decompresses it into an LR image using a first decompression method corresponding to the first compression method as above. For example, the PNG file may be decompressed using a PNG decompression method to obtain a LR image in RGB format.

The parameter decompressor 730 received the compressed parameter from the demuxer 710 and decompresses it into a parameter for using by the upscaler 740. The parameter is decompressed using a second decompression method corresponding to the second compression method. For example, the second decompression method may be any new or conventional decompression method. Forward compatibility is thus maintained with respect to the decompression of the parameter. For example, the zip file can be decompressed to obtain a parameter of 6000 32-bit floating point numbers, which can be used by a SRCNN (super resolution convolutional neural network) standard network.

As stated above, the downscaling method in encoding device 500 may be different from (and simpler than) the upscaling method to be adopted by the upscaler 740, that is to say, the parameter is independent from downscaling the original HR image into the downscaled LR image.

The upscaler 740 receives the LR image and the parameter, and upscales the LR image into a HR image HR2 that approximate the original HR image HR1 as above. For example, an SRCNN upscaler may receive the LR image and the parameter of 6000 32-bit floating point numbers and using the parameter of 6000 32-bit floating point numbers as its model parameters to obtain a HR image HR2. If the original HR is downscaled using for example a bicubic method, the obtained HR2 could be much more similar to the original HR image than simply recovering the HR with a bicubic upscaler.

In some embodiments, the second decompression method may be unsupported by the decoding device 700. Then, the decoder 720 is further configured to provide the LR image as the recovered image.

Accordingly, the process 800 comprises steps S810-S840, which can be used by the decoding device 700 as above. Hence, some explanations of the details may be omitted here for simplicity.

In Step S810, a data stream is demuxed into a compressed LR image and a compressed parameter.

In Step S820, the compressed LR image is decompressed into an LR image using a first decompression method.

In Step S830, the compressed parameter is decompressed into a parameter using a second decompression method.

In Step S840, a recovered HR image is obtained by upscaling the LR image with the parameter.

In several embodiments provided by the present application, it should be understood that the disclosed systems, devices and methods may be implemented in other ways. For example, the embodiment of the device as described above is merely illustrative, for example, the division of the unit is only one logical function partitioning and the actual implementation may use an additional partitioning manner. For example, multiple units or components may be combined or may be integrated into another system, or some features can be omitted or not implemented. In one embodiment, the illustrated or discussed mutual coupling or direct coupling or communication connection may be indirect coupling or communication via some interfaces, devices or units, and may be in electrical, mechanical or other forms.

The elements described as separate components may or may not be physically separated, and the elements shown as units may or may not be physical units, that is, they may be located in one place or may be distributed over a plurality of network units. Some or all of the units may be selected according to actual requirements to realize the object of the present embodiment.

In addition, the respective functional units in various embodiments of the present disclosure may be integrated in one processing unit, or each unit may be physically included alone, or two or more units may be integrated in one unit. The above mentioned integrated unit can be implemented in form of hardware or in form of hardware plus software functional units.

The above described integrated units implemented in form of software functional units may be stored in a computer-readable storage medium. The software functional units described above are stored in a storage medium and comprise a number of instructions for enabling a computer device (which may be a personal computer, server, or network device, etc.) to perform a part of the method as described in the various embodiments of the present disclosure. The mentioned storage medium comprises a USB disk, a mobile hard disk drive, a read-only memory (ROM), a random access memory (RAM), a magnetic disk, an optical disk, and the like, each of which can store program code.

Finally, it is to be understood that the above examples are merely illustrative of the technical solutions of the present disclosure and are not to be construed as limitations thereof. While the disclosure has been described in detail with reference to the foregoing embodiments, it will be understood by those skilled in the art that the technical solutions described in the foregoing embodiments may be modified or equivalently substituted for some of the technical features, and that these modifications and substitutions do not depart from the spirit and scope of the technical solutions of the embodiments of the present disclosure.

The invention claimed is:

1. An encoding method comprising steps of:
   downscaling an input high resolution HR image into a low resolution LR image by a downscaler;
   compressing the LR image using a first compression method;
   extracting an index value from at least one of the HR image and the LR image;
   determining a parameter from a parameter database using the index value;
   compressing the parameter using a second compression method different from the first compression method; and
   obtaining a data stream by merging the compressed parameter and the compressed LR image;
   wherein the parameter has a form determined according to an upscaler to be used at a decoding device.

2. The method according to claim 1, wherein the index value comprises at least one of a content type of the HR image and a resolution of the LR image.

3. The method according to claim 1, wherein the parameter is independent from the downscaler.

4. The method according to claim 1, wherein downscaler is a bicubic downscaler, and the upscaler is a super resolution convolutional neural network upscaler.

5. An encoding device comprising:
   a downscaler configured to downscale an input high resolution HR image into a low resolution LR image;
   an encoder configured to compress the LR image using a first compression method;
   a parameter extractor configured to extract an index value from at least one of the HR image and the LR image and determine a parameter from a parameter database using the index value;
   a parameter compressor configured to compress the parameter using a second compression method different from the first compression method; and
   a muxer configured to obtain a data stream by merging the compressed parameter and the compressed LR image;
   wherein the parameter has a form determined according to an upscaler to be used at a decoding device.

6. The device according to claim 5, wherein the index value comprises at least one of a content type of the HR image and a resolution of the LR image.

7. The device according to claim 5, wherein the parameter is independent from the downscaler.

8. The device according to claim 5, wherein downscaler is a bicubic downscaler, and the upscaler is a super resolution convolutional neural network upscaler.

* * * * *